United States Patent [19]

Moses et al.

[11] Patent Number: 5,226,000
[45] Date of Patent: * Jul. 6, 1993

[54] METHOD AND SYSTEM FOR TIME DOMAIN INTERPOLATION OF DIGITAL AUDIO SIGNALS

[75] Inventors: Robert W. Moses; Raymond S. Miller, both of Seattle, Wash.; Charles H. Hustig, Hudson, Wis.; Donald W. Moses, Eagan, Minn.; Robert S. Bradford, Woodland Hills, Calif.; Jeffrey L. Ward, Hudson; Wayne P. Olson, River Falls, both of Wis.; Janice L. Cox, St. Paul, Minn.; James M. Kresse, Marlton, N.J.

[73] Assignee: Wadia Digital Corporation, River Falls, Wis.

[*] Notice: The portion of the term of this patent subsequent to Dec. 24, 2008 has been disclaimed.

[21] Appl. No.: 708,912

[22] Filed: May 31, 1991

Related U.S. Application Data

[63] Continuation-in-part of Ser. No. 597,512, Oct. 12, 1990, Pat. No. 5,075,880, which is a continuation of Ser. No. 268,830, Nov. 8, 1988, abandoned.

[51] Int. Cl.[5] ............................................. G06F 15/31
[52] U.S. Cl. ............................................. 364/724.10
[58] Field of Search ................. 364/724.10, 724.01, 364/723

[56] References Cited

U.S. PATENT DOCUMENTS

| | | | |
|---|---|---|---|
| 4,076,958 | 2/1978 | Fulghum | 381/51 |
| 4,408,094 | 10/1983 | Oura | 381/120 |
| 4,591,832 | 5/1986 | Fling et al. | 340/374 DA |
| 5,046,107 | 9/1991 | Iwamatsu | 381/107 |
| 5,075,880 | 12/1991 | Moses et al. | 364/724.10 |

OTHER PUBLICATIONS

Walter G. Jung, "IC Op-Amp Cookbook", 1980, pp. 315-319, Howard W. Sams & Co., Inc., 4300 W. 62nd St., Indianapolis, Ind. 46268.

J. Byerly & M. Vander Kooi, "National Semiconductor Handbook", LM380 Power Audio Amplifier, Dec. 1972, pp. AN69-1 to AN69-7.

Analog Devices, Inc., "Analog-Digital Conversion Handbook", 1986, p. 237, Prentice-Hall, Englewood Cliffs, N.J. 07632.

Primary Examiner—Long T. Nguyen
Attorney, Agent, or Firm—Dorsey & Whitney

[57] ABSTRACT

A method and system is provided for a digital audio system to reconstruct a digital audio signal using time domain interpolation and direct power digital-to-analog conversion. A signal processor performs the time domain interpolation on an original digital audio signal to allow for the proper recreation of the original audio signal and a direct power output digital-to-analog converter generates an analog power audio output signal from the interpolated digital audio signal that can directly drive a speaker to produce the sound waves represented by the audio output signal. The signal processor and direct power output digital-to-analog converter allow a digital audio system to more precisely reconstruct an analog power output audio signal from a digital audio signal such that there is no need for further amplification of the audio output signal and such that there will be no perceptible difference between the reconstructed digital signal and the original analog signal.

32 Claims, 9 Drawing Sheets

FIG. 2
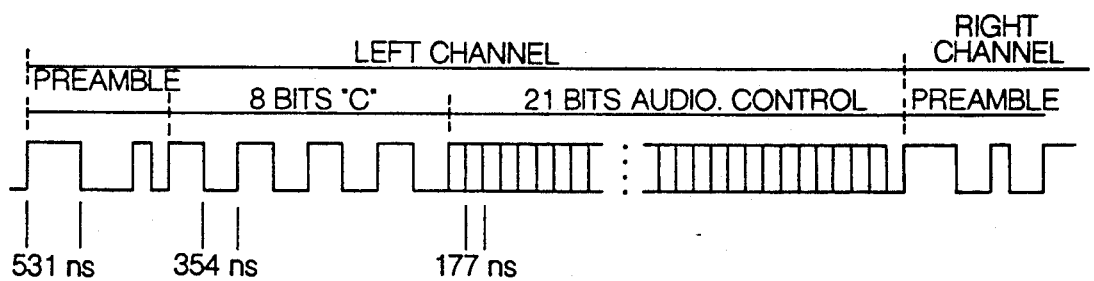
FIG. 3a  FIG. 3b
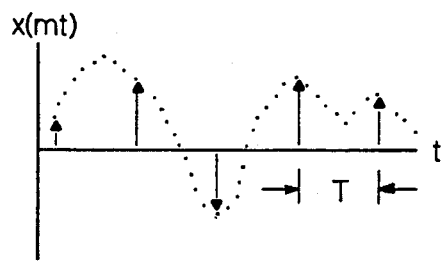 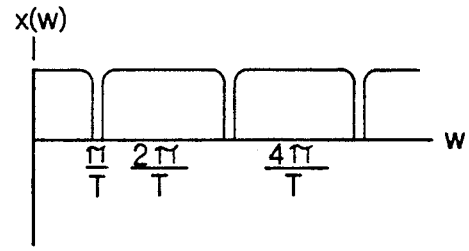
FIG. 4a  FIG. 4b
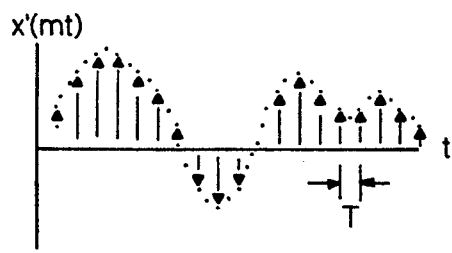 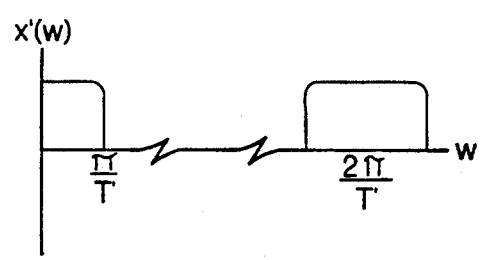

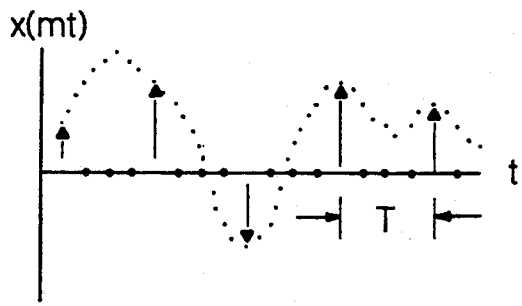
FIG. 5
FIG. 6
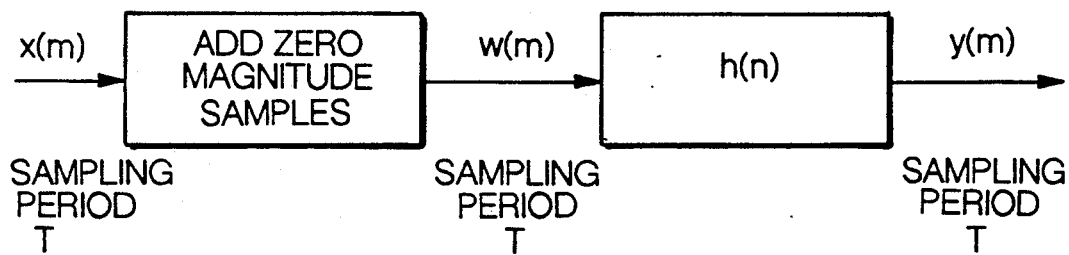
FIG. 7
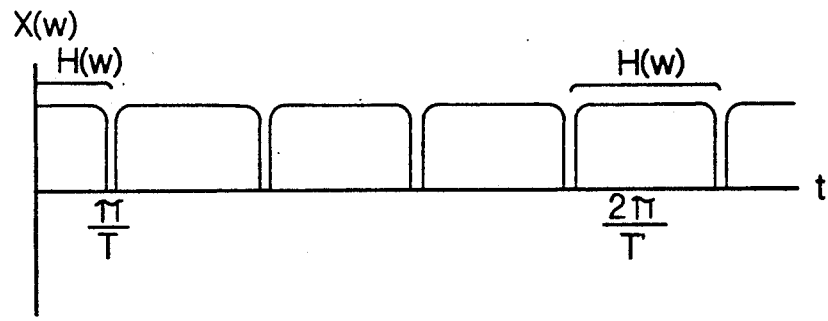

FIG. 9

$$z_j = \sum_{i=0}^{N-1} w_{i,j} \, y_{N-i-1}$$

NOTE THAT $z_0 = y_{N/2-1}$ (N EVEN)

METHOD AND SYSTEM FOR TIME DOMAIN INTERPOLATION OF DIGITAL AUDIO SIGNALS

RELATED APPLICATIONS

This application is a continuation-in-part of an application filed in the United States Patent and Trademark Office entitled METHOD AND APPARATUS FOR TIME DOMAIN INTERPOLATION OF DIGITAL AUDIO SIGNALS, Ser. No. 07/597,512 filed on Oct. 12, 1990, and issued as U.S. Pat. No. 5,075,880, which is a continuation of patent application Ser. No. 07/268,830, filed on Nov. 8, 1988, now abandoned, which is assigned to the assignee of the present invention and which is hereby incorporated by reference in the present application.

This application is also related to the co-pending application filed in the United States Patent and Trademark Office concurrently herewith, etitled DIRECT POWER OUTPUT DIGITAL TO ANALOG CONVERSION OF DIGITAL AUDIO SIGNALS, Ser. No. 07/712,160, filed on May 31, 1991, which is assigned to the assignee of the present invention, a copy of which is attached and hereby incorporated in the present application.

TECHNICAL FIELD

The present invention relates generally to the field of digital audio systems. More particularly, the present invention relates to a method and system for time domain interpolation of digital audio signals that will allow a digital audio system to resonstruct an analog power audio output signal directly from a digital audio signal.

BACKGROUND ART

Digital audio systems are well known in the prior art. Presently, two types of digital audio systems, the compact disc (CD) and the digital audio tape (DAT), are enjoying commercial success as mass production audio reproduction systems. While the benefits of digital recordings over conventional analog recordings are also well-known, digital audio systems have failed to attract critical listeners of professional or high-end audio systems. Such listeners are accustomed to enjoying immaculately precise and realistic music reproduction currently possible with professional or high-end analog systems. Because of deficient stereophonic imaging of current digital audio systems, digital audio technology has in the past been rejected by the professional and high-end audio markets.

The goal of any digital audio system is to sample and reconstruct an analog audio signal, without noticeable changes to the signal, to recreate authentic sounding music. If, for example, the audio signal is sampled at a recording studio and the digital samples are stored on a CD, then the CD player must retrieve the digital samples and reconstruct the waveform of the audio signal as closely as possible to the waveform of the original analog signal.

In theory, any analog signal can be reconstructed if an infinite number of digital samples are taken of the analog signal. In practice, the sampling rate of a digital audio system is governed by the Nyquist Theorem that any signal may be sampled and reconstructed provided the sampling rate is at least twice the highest frequency component of the original analog signal. An insufficiently high sampling rate tends to create an overlap in the reconstructed signal that gives rise to a special form of distortion known as aliasing. When the sampling rate is too low, the frequency domain images of the reconstructed signal overlap with the baseband and corrupt the higher frequency components of the baseband. Avoidance of aliasing is a primary goal of the sampling process of a digital audio system.

Because human hearing is usually considered to be bandlimited to 20 KHz, some prior art digital audio systems have proposed that a 20 KHz bandwidth is sufficient for high quality audio reproduction systems. The 20 KHz figure is based partly on tests where a subject is instructed to listen to a sinusoidal waveform that continuously increases in frequency and determine when the signal becomes inaudible. Most people will not be able to detect such a signal once it reaches 20 KHz. The audio bandwidth of current CD systems is 20 KHz and the guard band is 2 KHz. Therefore, the digital sampling rate, in accordance with the Nyquist Thereom, is 44.1 KHz. The audio bandwidth of current DAT systems is 20 KHz, and the guard band is 4 KHz, yielding a digital sampling rate of 48 KHz.

Although, the human ear is incapable of detecting steady frequencies above 20 KHz, this does not mean that audio signals can be routinely bandlimited to this amount and still achieve high quality audio reproduction. In fact, studies have indicated that the human ear can perceive sonic effects of transient components of audio signals up to frequencies as high as 100 KHz. When an audio signal comprised of many transient pieces of high frequency sinusoids is passed through a digital audio system limited to a 20 KHz bandwidth, the transients will be spread out and will lose their transient nature, thereby degrading the quality of the audio reproduction if the digital audio system does not provide for some thpe of correction to the reconstructed signal in the time domain.

Transients are necessary for professional and high-end audio reproduction because they are important to human hearing in the reconstruction ofd wavefronts that yield the three0dimensional ambience associated with stereophonic signals. To most listeners of professional or high-end audio systems, it is criticalthat the reproduced music posses this three-dimensional ambience where each individual sound source is perceived as being located on an imaginary sound stage. Indeed, the illusion of a stable three-dimensional sound image is the fundamental feature on which stereo sound is predicated.

Transients are also important in the resolution of the individual nuances of each of the sound sources. Natural music consists of characteristic noises and momentary silences between notes or overtone oscillations. it is important to prevent sonic blurring of these subtle nuances in the program material. Such details are easily destroyed by audio systems with poor transient response or excessive thermal noise and distortion, with the reproduced music sounding muddy and devoid of fine detail.

The presence of many transient pieces of high frequency sinusoids in audio signals requires a higher sampling rate or correction of the reconstructed signal in the time domain for exact reproduction of those transient signals. For example, a 20 KHz sinusoid signal will be reproduced exactly by an audio system having a 20 KHz bandwidth only if the signal is turned on at a time of minus infinity and is never turned off. Once a signal is turned on and then turned off after a given number of cycles (i.e., a transient signal is created), a higher bandwidth is required in order to exactly reproduce that signal. In general, The required bandwidth to pass a finite number of cycles of a sinusoidal signal ($F_S$) is: $BW=F_S*(1+1/\#\ of\ cycles)$. For example, the required bandwidth to pass one cycle of a 15 KHz sinusoidal signal would be 30 KHz, a frequency much higher than the 20 KHz bandwidth limit of current digital audio system. Unfortunately, it is not practical to digitally sample audio signals to preserve frequencies up to 100 KHz becausse to do so would greatly increase the amount of digital information to be stored, therefore the parent application to the present invention taught that a time domain correction could be utilized to more acccurately reconstruct digital audio signals so as to preserve the high frequency transients associated with musical information.

The problem of an insufficient sampling rate to reproduce high frequency transients in current digital audio systems is further compounded by the use of frequency domain brickwall filters to smooth the digital samples during the reconstructing of the analog audio signal. Early digital audio systems utilized an analog brickwall low pass filter in the digital-to-analog conversion to extract the baseband frequencies and reject the sampled harmonics above the bandwidth of the system. The analog brickwall filter fills in and smooths the signal between the points inthe step function output created by averaging the samples together. In essence, the brickwall filter rounds off the edges of the signal output to create a smooth analog signal output.

Theoretically, a frequency domain method of digital audio signal reconstruction should work if the low pass brickwall filter could ideally pass all signals below its threshold or roll-off frequency at unitary gain and reject all signals above its roll-off frequency, and if the distance between the digital sample points is small enough that information is not lost during the sampling process. Unfortunately, an ideal low pass filter can not be realized. While it is possible to create a low pass brickwall filter that has excellent frequency domain specifications when driven by constant-energy-envelope sinusoids, when this brickwall or taut filter is driven by the transients and impulses of dynamic music material it generates overshoot, ripple and ringing. Because the sampling rated for CD and DAT systems are close to the minimum allowed Nyquist rate (40 Khz), most of the quantization noise generated by the sampling process will be concentrated in the base band audio range. In addition, spurious energy frequencies that extend from close to the base band to the top of frequency region are the frequencies that are most susceptible to analog audio amplifier nonlinearities (100 KHz−2 MHz).

The process in current digital audio systems is therefor non-optimal as designed in the frequency domain, both because of the inadequate sampling rate and because of the imperfect brickwall filter.

In an attempt to solve these problems, a ethod known as "oversampling" is used by some prior art digital audio systems to increase the sampling rate to a rate typically four times the original sample rate (e.g., 176 KHz for CD's). The basic idea of the prior art oversampling techniques is to implement a digital low pass filter to carry out the function of the analog brickwall smoothing filters, with samples retrived from the digital low pass filter at the higher oversampling rate. This is possible by adding zero magnitude (trivial) samples between each of the original samples to effectively increase the sampling rate of the system, althought the trivial samples add no new information to the signal. For a more detailed explanation and critique of the prior art oversampling techniques, reference is made to Moses, R., "Improved Signal Processing for Compact Disc Audio System", *Proceedings: Montech '87 IEEE Conference on Communications,* Nov. 9–11, 1987, pp. 203–211, which is fully incorporated by reference herein.

The problem with current frequency domain oversampling techniques is that the digital fitler, sometimes referred to as a Finite Impulse Response (FIR) filter must meet the same stringent ideal demands as the analog brickwall filter it replaces. Any deviation from an ideal low pass filter will cause corresponding alteration of the output signal. The design of the digital filters for current oversampling techniques is accomplished by normalizing the frequency parameters to the sampling rate. For example, if the sample rate is 44 KHz and the filter roll-off frequency is 20 KHz, the design frequency parameter will be 20 KHz/44 KHz=0.4545. In the case of an oversampling FIR filter, the final sampling rate must be used as the design parameter. If a four times oversampling FIR filter is desired, the design parameter will be 20 KHz/176 KHz=0.1136. The digital audio system must also include a transistion band that spans the bandwidth of the transition region between 20 KHz–22 KHz, or a 2 KHz bandwidth. If a sixteen times oversampling FIR filter is desired for the transition band, the design parameter will be 2 KHz/704 KHz=0.0028. Such normalized frequency parameters are too small for the calculations required to derive the associated filter because the numbers do not contain enough significant digits. Without a sufficient number of significant digits in the calculation, these parameters introduce deviation from the desired response. As a result, the frequency domain design method for the digital FIR oversampling filters is unable to accommodate high oversampling rates or a correction to the reconstructed signals in the time domain.

Another limitation of current frequency domain oversampling techniques lies in the alteration of the filter coefficients. It is desirable to maintain a constant gain through the filter as the input signals are passed through it. By adding zero magnitude samples between the original samples, the amount of samples weighted by the filter at any instant of time are reduced in proportion to the number of trival samples added. Because not all of the coefficients of the original samples are used in the calculation of the output, the gain will vary as samples are shifted through the filter. This causes a corresponding deviation in the magnitude of the output signal that the listener may hear as an echo due to passband ripple.

A further problem in the design of the FIR digital filters in the frequency domain is the arbitrary nature of choosing the appropriate frequency domain parameters. For example, with a given FIR filter order (typically 100 taps), parameters for each of the pass band, transition band, and stop band characteristics must be weighed in the specification of the filter. Without knowing reliable, acceptable figures for these parameters, the designer is effectively guessing at appropriate values for the filter.

Primarily because of the problems outlined above, current frequency domain oversampling techniques are not capable of producing sufficiently high oversampling rates which can accomplish a correction to the reconstructed signals in the time domain. Consequently, the spurious energy frequencies represented by the high frequency transients still fall in the nonlinear range of most analog audio amplifiers, and, as a result, these systems do not sufficiently overcome the discussed problems.

In addition to the frequency transient problems associated with the non-linear range of existing amplifiers, the very existence of analog amplifiers in present digital audio systems reintroduces the types of time dispersion, thermal noise and signal distortion problems which digital audio systems seek to eliminate. The problems caused by this mismatch between the digital-to-analog conversion process of current digital audio systems and the analog amplification of the line level signals produced by such digital audio systems are described in greater detail in the previously identified co-pending application entitled DIRECT POWER OUTPUT DIGITAL TO ANALOG CONVERSION OF DIGITAL AUDIO SIGNALS.

Although the present designs of digital audio systems are adequate for reproducing musical sound, it would be advantageous to have a method and system for interpolating digital audio signals that will allow a digital audio system to reconstruct an analog power audio output signal directly from a digital audio signal such that there is no need for further amplification of the audio output signal and such that there will be no perceptible difference between the reconstructed signal and the original signal.

SUMMARY OF THE INVENTION

In accordance with the present invention, a digital audio system for reconstructing high quality audio signals includes a signal processor means and a direct power output digital-to-analog conversion means. The signal processor means reconstructs a digital audio signal by interpolating the digital audio signals in the time domain to allow for the proper recreation of the original audio signal and the direct power output digital-to-analog conversion means generates an analog power audio output signal from the interpolated digital audio signal that can directly drive a speaker to produce the sound waves represented by the audio output signal. The signal processor means includes input means for receiving and decoding the digital audio signals comprised of a receiver means for receiving the digital audio signal, phase lock loop means for extracting timing information from the digital audio signal, and decoder means for demodulating the digital audio signal. The signal processor means also include a digital processor means for performing a time domain interpolation on the decoded signal to produce an interpolated data signal having an increased sampling rate over the original digital audio signal and a digital volume control means for adjusting the volume of the audio output signal that will drive the speaker by digitally adjusting the interpolated data sample. The direct power output digital-to-analog conversion means then converts the volume adjusted interpolated data signal into an analog power audio output signal that may be directly transmitted to the speaker to produce sound.

In a preferred embodiment of the present invention, the digital processing means is comprised of two parallel signal processors, one for each channel, each signal processor itself being comprised of a pair of interleaved digital signal processors, each performing the calculations for either the even or odd coefficients of a spline-based time domain interpolation. The outputs of the signal processors are directly converted to an analog power audio output signal by a series of cascaded co-linear digital-to-analog converters (DACs) immediately coupled to one or more instantaneous current-to-voltage operational amplifier converters whose output is operable connected to the summing junction of the operational amplifier converters to form a single resistive feedback network. The result is a figital audio system capable of reconstructing hte high frequency and transient characteristcs of the digital audio signals in the time domain and directly converting the reconstructed digital signal into a power analog audio output signal, thereby enabling the reproduction of high-quality musical sound ina professional and high-end digital audio system without the need for further amplification of the audio output signal by an analog amplifier.

Accordingly, a primary objective of the present invention is to provide a method and system for time domain interpolation of digital audio signals that will allow a digital audio system to more precisely reconstruct an analog power audio output signal from a digital audio signal such that there will be no perceptible difference between the reconstructed signal and the original signal.

Another objective of the present invention is to minimize time dispersion problems associated with the reconstruction of the digital audio signal by providing a method and system for performing a time domain unterpolation to reconstruct the digital audio signal.

An additional objective of the present invention is to provide a method and system for interpolating digital audio signals that will allow a digital audio system to reproduce an analog power audio output signal directly from a digital audio signal reconstructed in the time domain such that there is no need for further amplification of the analog power audio output signal.

These and other objectives of the present invention will become apparent with reference to the drawings, the description of a preferred embodiment and the appended claims.

DESCRIPTION OF THE DRAWINGS

FIG. 2 is a graphic representation of a segment of digitized music material represented in the standard AES/EBU digital audio data format.

FIGS. 3a and 3b are a time and frequency domain representation of a sampled audio signal.

FIGS. 4a and 4b are a time and frequency domain representation of the sampled audio signal of FIGS. 3a and 3b showing the desired spectrum of the sampled signal.

FIG. 5 is a time domain representation of the sampled audio signal of FIG. 3a showing the original sampled signal with zero magnitude (trivial) samples added.

FIG. 6 is a block diagram of an oversampling system.

FIG. 7 is a frequency domain representation of an ideal low pass filter used to extract the baseband signal during the digital-to-analog conversion.

FIG. 9 is a diagrametric representation of time domain interpolation using the spliine-based algorithm of a preferred embodiment by convolution with zero padded samples.

DESCRIPTION OF A PREFERRED EMBODIMENT

The Digital Audio System

Figure 1:
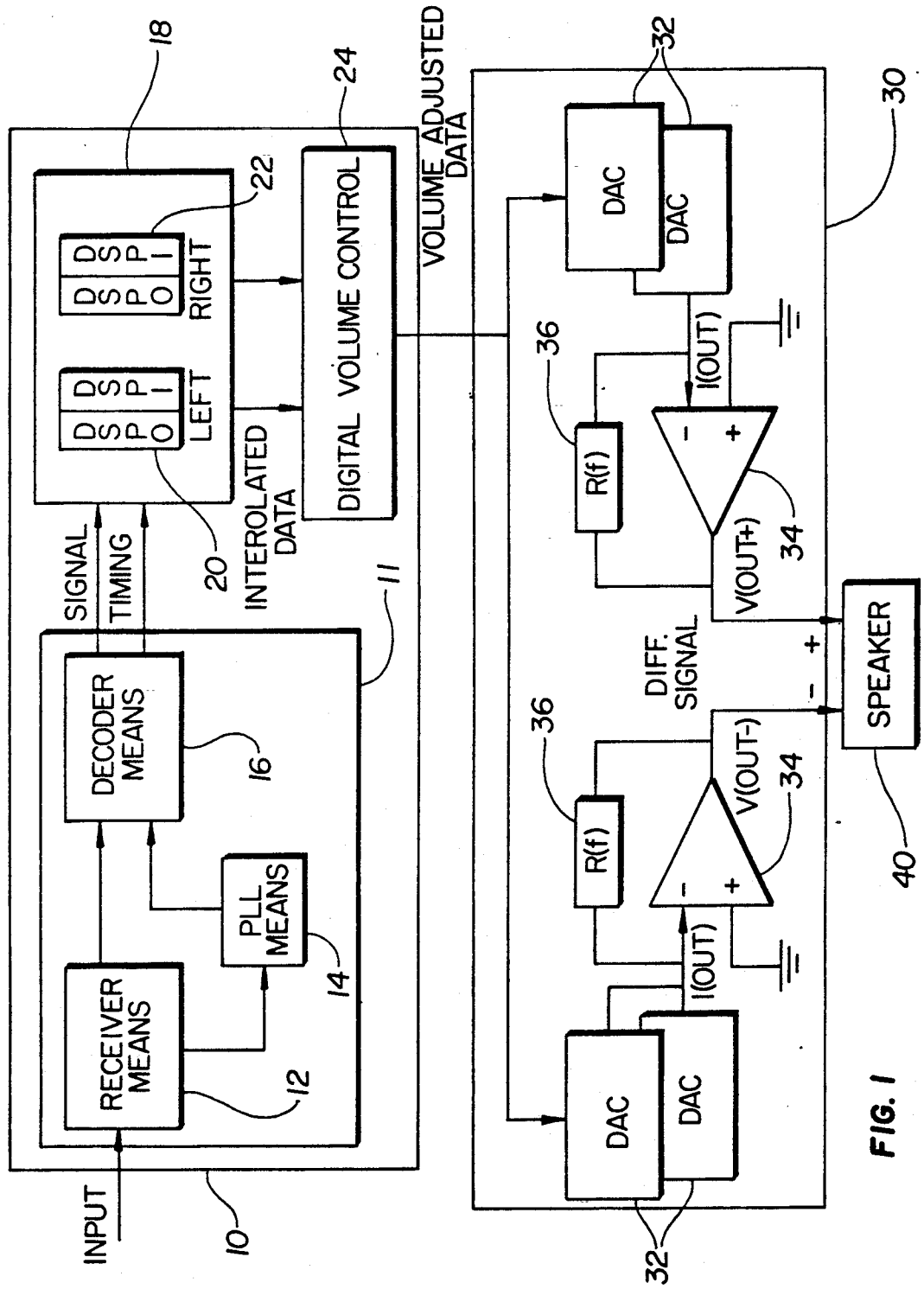
FIG. 1 is an overall block diagram showing the relationships among the components of a signal processing means in accordance with the present invention.

Referring not to FIG. 1, the components of a preferred embodiment of a digital audio system in accordance with the present invention will be described. The digital audio system includes a signal processor means 10 for porcessing stereo digital audio signals and a direct power output digital-to-analog conversion means 30 for outputting analog power audio output signals to drive a speaker 40. For ease of representation, FIG. 1 shows only the digital-to-analog conversion means 30 and speaker 40 for one of the channel output signals (the right channel signal). Although a preferred embodiment willbe described in terms of a stereo digital audio system, it willbe recognized that the signal processor means 10 and direct power output digital-to-analog conversion means 30 of the present invention are equally applicable to monaural and multi-track audio signals as well.

The signal processor means 10 includes input means 11 for receiving and decoding the digital audio signals in the form of Input Data from a digital audio signal source. In a preferred embodiment, the Input Date represents digitized samples of the musical material transmitted in a predetermined stero format (i.e., both left and right channel). The Input Data enters a receiver means 12 that receives the Input Data and then synchronizes the Input Data with an internal clock signal via a phase-lock loop means (PLL) 14. A decoder means 16 performs the data demodulation and format decoding of the Input Data to extract the Signal and Timing Data portions of the Input Data. The Signal and Timing Data are then processed by a digital processor means 18 that utilizes two digital signal processor means (DSPs) 20 and 22 to perform the time domain interpolation that results in an Interpolated Data Signal. The volume of the Interpolated Data Signal generated by the digital processor means 18 is set by a digital volume control means 24 which digitally alters the Interpolated Data Signal to Produce a Volume Adjusted Data Signal. The digital signals that comprise the Volume Adjusted Data Signal are then converted into a pair of differential power analog audio Output Signals by the direct power output digital-to-analog conversion means 30.

In a preferred embodiments, the Input Data is provided to the signal processor means 10 by a remotely located professional fiber optic transmitter (not shown) that utilizes graded index, 62.5 micron, glass optical fiber cable and metal/ceramic precision lens professional quality ST ® connectors avalable from AT&T, Allentown, PA. The receiver means 12 also uses professional quality ST ® connectors, thereby creating a high-performance link for receiving the Input Data that is designed to accommodate data rates up to 50 Mbits/second and distances up to 3 km. In a preferred embodiment, the receiver means 12 further includes a daisy chain optical output connector (not shown) that also uses the professional quality ST ® connectors, thereby allowing the digital audio system to ge linked with other similar digital audio system as part of a multi-room audio installation, for example.

In a preferred embodiment, the phase lock loop means 14 is implemented as a frequency lock loop having a crystal controleld oscillator which tracks an internal clock signal to the input clock frequency. It will also be recognized that many other types of phase lock loops or clock recovery schemes could be used to accomplish the same purpose.

The decoder means 16 demodulates and decodes the Input Data to separate the Input Data into Signal and Timing Data depending upon a preselected format. In a preferred embodiment, the decoder emans 10 of the signal processor means 10 may ny selectably programmed to received CD Input Data (44.1 KHz), R-DAT Input Data (48 KHz), or Satellite Input Data (32 KHz). The sample Format for Input Data received in the standard AES/EBU digital audio format shown in FIG. 2 demonstrates the relationship between the Signal Data and the Timing Data as each are represented in the particular format for the Input Data. The decoder means 16 also provides the basic clock and framing signals to the rest of the components of the signal processing means 10. In a preferred embodiment, the decoder means 16 is implemented using a first programmable gate array that incorporates the necessary digital logic to perform the standard decoding and demodulation operations for AES/EBU digital audio format. It will be recognized that there are also many commercially available decoders for standard digital audio signals which can accomplish this same function. For a more detailed explanation of the AES/EBU digital audio format, reference is made to *AES Recommended Practice for Digital Audio Engineering—Serial Transmission Format for Linearly Represented Digital Audio Data*, ANSI Standar 4.40-1985 which is fuly incorporated herein by reference.

The digital processor means 18 is comprised of two parallel digital signal processor means 20 and 22, each digital signal processor means consisting of a pair of digital signal processor integrated circuits, oscillators, ROMS, and supporting buffers adn latches. In a preferred embodiment, digital signal processor means 20 performs the time domain interpolation for the left channel signal and is comprised of a pair of DSPs, DSP0 and DSP1 - Left. Digital signal processor means 22 performs the time domain interpolation for the right channel signal and is also comprised of a pair of DSPs, DSP0 and DSP1 - Right. DSP0 and DSP1 - Left and DSP0 and DSP1 - Right are comprised of four WE DSP16 chips, also available from AT&T, the operation of which is more fully described in the *Data Sheet for the WE DSP16*, Oct. 1986, which is fully incorporated by reference herein. In a preferred embodiment, the digital signal processor means 20 and 22 generate the Interpolated Data as 16 bit digital samples. These 16 bit samples are fed into the digital volume control means 24 and a 20 bit result in the form of the Volume Adjusted Data is produced as a result of the multiplication of the Interpolated Data with a 7-bit left or right channel Digital Volume Control Value. The Volume Adjusted Data from the digital volume control 24 is then immediately sent to the direct power output digital-to-analog conversion means 30 for outputing the analog power audio output signals that directly drive the speaker 40.

The digital volume control means 24 accomplishes a digital volume adjustment by means of a separate hardware multiplication of the Interpolated Data with the Digital Volume Control Value for the respective channel. The 7-bit Digital Volume Control Value allows for 128 linear volume control increments to be implemented by the digital volume control means 24. In this embodiment, the digital volume control means 24 is implemented using a shift and add-type algorithm contained in a second programmable gate array. This second programmable gate array can also handle incidental channel latching and signal connection functions between the signal processor means 10 and the direct power output digital to analog conversion means 30. In another embodiment, the function of the digital volume control means 24 is accomplished by way of a software routine within the digital signal processing means 20 and 22 that performs the same multiplication of the Interpolated Data with the Digital Volume Control Value. The separate hardware digital volume control means 24 can be used to maximize the time available to the digital signal processor means 20 and 22 for performing the time domain interpolation of the present invention, whereas the software digital volume control means 24 can be used to minimize the amount of circuitry external to the digital signal processors 20 and 22 which is required by the present invention.

In a preferred embodiment, the direct power output digital-to-analog conversion means 30 is configured as a differential digital-to-analog converter having a transversal, summed-multiport analog delay line comprised of four DACs 32, one pair of DACs 32 for each rail voltage of the differential signal that together produce an analog current output ($I_{out}$) which is then immediately amplified to an analog power audio output signal ($V_{out}$) by the respective power current-to-voltage operational amplifier means 34. The power current-to-voltage operational amplifier means 34 includes a single resistive feedback means 36 connected between the output terminal and the summing junction input of the power current-to-voltage operational amplifier means 34 for providing a single analog feedback signal within the direct power output digital-to-analog conversion means 30. In a preferred embodiment, the DACs 32 are four conventional 20-bit co-linear DACs, for example a PCM63P available from Burr-Brown of Tucson, Arizona, or four high quality 20-bit resistor ladder DACs, for example the AD1862 available from Analog Devices of Norwood, Mass. The Power current-to-voltage operational amplifier means 34 in a preferred embodiment is comprised of a set of four parallel LN12C operational amplifiers available from National Semiconductor of San Jose, CA., that are driven by series connection from a OPA455BM operational amplifier, also available from Burr-Brown.

In a preferred embodiment, The DACs 32 are connected so as to form a 4× delay line by summing their outputs together. In this embodiment, the first DAC 32 is delayed by ¼th of the frame time of the frame of interpolated data just calculated by the signal processor 10. The second DAC 32 is delayed ½ of the frame time, the third DAC 32 is delayed ¾th of the frame time and the fourth DAC 32 is delayed one full frame time. The data from the first and third DACs 32 forms the output signal at the positive terminal of the differential Audio Output Signal ($V_{out+}$), while the data from the second and fourth DACs 32 forms the output signal at the negative terminal of the differential Audio Output Signal ($V_{out-}$). The result is a first order Lagrangian interpolation filter providing four times the oversampling above what is generated by the digital signal processor means 20 and 22. This process also effectively increases the bit resolution of the Volume Adjusted Data Signal from 20 bits to 22 bits at full power. For a more detailed description of the direct power output digital-to-analog conversion means 30, reference is made to the previously identified co-pending application entitled DIRECT POWER OUTPUT DIGITAL TO ANALOG CONVERSION OF DIGITAL AUDIO SIGNALS.

While the signal processing means 10 and direct power digital-to-analog conversion means 30 are shown in the embodiment described herein as separate from the means for retrieving the Input Data from a recording media (not shown) and the speakers 40 for converting the analog power audio output signals into sound waves, it is also possible to incorporate the signal processing means 10 and direct power digital-to-analog conversion means 30 within a digital audio system that included these components. It is also possible to use the digital audio system of the present invention in the transmission of live music material, for example, a satellite broadcast of a concert. It should be understood that the scope of the present invention includes any combination of the various components that comprise the signal processing means 10 and direct power digital-to-analog conversion means 30, regardless of the ultimate configuration or type of digital audio system with which the present invention may be used.

Theoretical Concepts Behind Sample Rate Increase

Referring now to the sampled signal shown in FIGS. 3a and 3b, both the time domain and frequency domain representations of a sampled audio signal are shown. T represents the sampling rate. As can be seen by reference to the frequency domain characteristic shown in FIG. 3b, the sampled signal has been quantized at the lowest allowable rate specified by the Nyquist therorem.

Clearly, it would be advantageous to move the higher harmonics of the sampled signal to a more distant point in the frequency domain as shown in FIG. 4b. This would correspond to the original analog signal sampled at a higher rate T'. A system and method to add $L-1$ samples between each of the original samples, as shown in FIG. 4a, would effectively increase the sampling rate by a factor of L.

The time domain signal of FIG. 5 is identical to that of FIG. 3a with the addition of $L-1$ samples of zero magnitude between each of the original samples. The sampling rate has therefore been increased by a factor of L, but no new information has been added to the sampled signal. Thus, the frequency domain characteristic is expected to resemble that of the original signal.

It is now desired to move the zero magnitude samples to their respective positions int he original analog waveform, thus achieving the interpolation of $L-1$ new zero magnitude samples between each pair of original samples. A current frequency domain method to accomplish this is diagramed in FIG. 6. Performance of the system of FIG. 6 can be analyzed as follows. Assume that the orignal sampling period is equal to T and the interpolated sampling period is T'. If the sampling rate increase is a factor of L then, $$T = T/l \quad \text{(Eq. 1)}$$

The first block in FIG. 6 carries out the operation of inserting $L-1$ samples of zero magnitude between each of the original pairs of samples. The resultant signal, w(m) is shown in FIG. 5. The signal w(m) can be related to the original signal, x(m), as follows:

$$w(m) = \{x(m/L) \; m = 0, +/-L, +/-2L \} \quad \text{(Eq. 2)}$$

Taking the Z transform of w(m).

$$W(Z) = \sum_{m=-\infty}^{+\infty} w(m) Z^m \quad \text{(Eq. 3)}$$

$$= \sum_{m=-\infty}^{+\infty} x(m/L) Z^m$$

$$= \sum_{m=-\infty}^{+\infty} x(n) Z^{nL}$$

which implies $$W(Z) = X(Z^L) \quad \text{(Eq. 4)}$$

Now, evaluating W(Z) on the unit circle, $Z = e^{jwT}$ results in the Discrete Frourier Transform (DFT) of w(m):

$$W(e^{jwT}) = X(e^{jwTL}) \quad \text{(Eq. 5)}$$
$$= X(e^{jwT'})$$

The function $W(e^{jwT})$ is periodic or "wrapped" in the frequency domain with period $2\pi/T = 2\pi/LT$, rather than a period of $2\pi/T'$ as is the case for sequences sampled at a period T. Thus, this operation has not changed the frequency content of the signal, only the period of wrapping in the frequency domain.

It is now necessary to eliminate the spectral energy associated with the undesired original harmonic components. This is accomplished by the special filter, h(n) shown in FIG. 6. Theoretically, this filter would be an iedal lowpass filter with cutoff at $2\pi/T$ and period T' as shown in FIG. 7.

Following an ideal low pass filtering of the sampled signal as shown in FIG. 5 with zero magnitude samples added, the frequency domain signal of FIG. 4b would be obtained. This signal is exactly the signal obtained if the original analog waveform had been sampled at the higher rate, T'. Thus, the system of FIG. 6 effectively increases the sampling rate by a factor of L.

There is, unfortunately, one problem with this approach. The impulse response of an ideal low pass filter is of infinite duration and is, therefore, impractical for Finite Impulse Response (FIR) implementation. Various sophisticated FIR design procedures have been employed in the implementation of filters for digital audio playback devices that have attempted sampling rate increases, but as noted earlier, these systems have failed to achieve acceptance by critical listeners. One significant problem in the designation of these filters is the arbitrary nature of choosing the appropriate frequency domain parameters. For example, with a given FIR filter order (typically 100 taps), passband, transition band, and stopband characteristics must be weighted in the specification of the filter. Without knowing reliable, acceptable figures for these parameters, the designer is effectively guessing at the appropriate values. Only through great luck could the optimal filter be designed under these conditions. The present invention overcomes these deficiencies in the prior art by designing the interpolation filter in the time domain where the elusive optimal frequency domain filter parameters are not required. The interpolating filter primarily fulfills a curve fitting function rather than a frequency domain filtering operation and the paramount concern should be the error in the interpolated data. Traditional frequency domain filter design does not satisfactorily treat this concern. A time domain design procedure for designing the interpolation filter in accordance with the present invention will perform the smoothing of the filter designated h(n) in the system shown in FIG. 6.

Time Domain Interpolation

In a preferred embodiment of the present invention, the interpolation of the sampled digital audio signal is performed as a time domain interpolation that involves the generation of a polynomial that passes through Q original sample points along the magnitude curve of the signal as represented in the time domain. In essence, the signal processing means 10 computes a running set of parameters that fit a curve to the contour of Q original samples, somewhat like pushing a french curve along the sample points and determining the best fit curve for the next set of sample points and then drawing in that curve by filling in the desired number of new samples between each of the original sample points.

There exist a number of useful interpolation algorithms that may be used in the numerical analysis required to perform the time domain interpolation of the present invention. Many of these algorithms are of an iterative nature and are relatively wasteful of valuable processing time when implemented in real time systems. Thus, only non-iterative interpolation schemes will be considered.

Two possible non-iterative interpolation schemes for providing a digital filter by use of time domain interpolation are Lagrangian and spline-based interpolations. The frequency response of any time domain interpolation method must be checked of course, but it can be expected to be good for either Lagrangian or spline-based interpolation, because the original waveform is closely approximated, given that it is bandwidth-limited. Linear phase is also a desirable aspect of a time domain digital filter, especially for audio, as it is in effect a constant time delay for all frequencies. There is no actual phase distortion, the signal is simply delayed. The Lagrangian interpolation set forth in the previously identified parent application has been formulated as a linear phase FIR filter. The spline-based interpolation method of a preferred embodiment of the present invention as described hereinafter has also been designed to have this characteristic. For a general discussion of both Lagrangian and spline-based interpolation algorithms, reference is made to Lee W. Johns, R. Dean Riess, *Numerical Analysis*, Addison-Wesley (1982), pp. 237-247.

The Lagrangian interpolation that is described in greater detail in the previously identified parent application provides a polynomial of degree $n-1$ that may be fit uniquely to n points representing a portion of the "curve" of the original audio signal. In the situation where n points are considered:

$$(n_{even}) \ (X,Y)_0 \ldots (X,Y)_{n-1} \quad \text{(Eq. 6)}$$

then the Lagrangian polynomial is used for the interval:

$$(X_k, X_{k-1}), \text{ where } k=(n/2)-1 \quad \text{(Eq. 7)}$$

A new set of points and therefore a new polynomial (or possibly the same one) is used for the next interval, and so forth.

However, the reconstructed curve produced by this type of Lagrangian interpolation scheme may tend to exhibit oscillatory behavior, especially around the first and last few sample points. This means that although the oscillatory behavior is typically small in the critical "center" interval $[X_k, X_{k-1}]$, the curve produced in that center interval is necessarily affected to a certain degree by the error near each end of the group of samples. Specifically, some of the derivatives are poorly estimated at all sample points when the Lagrangian interpolation algorithm is used.

In a preferred embodiment of the present invention, a spline-based interpolation scheme is used. Splines are considered to be good for reconstruction of sampled smooth functions, and especially good at estimating the derivatives at the sample points. A spline-based algorithm is generally based on a set of cubic polynomials joined at the sample points. They form a curve which is piecewise continuous, with continuous first and second derivatives throughout, even at the sample points. The third derivative is of course discontinuous in general, being a constant within each interval. A spline forms the same curve as that formed by an ideal thin elastic rod held fixed at physical locations defined by $\{X_i, Y_i\}$, the sample points. It minimizes the energy of curvature by minimizing the integral of the square of the second derivative. A lack of oscillatory behavior is one benefit of using the spline-based algorithm.

Splines are usually calculated by starting with a discrete set of n points, equally spaced, and solving a matrix equation which determines a set of low-order polynomials, which are usually cubics. Each of the $n-1$ functions interpolates between an adjacent pair out of the n points. The process is not computationally complex, but does require some computation time. A complete spline, however, does more than may be necessary because it interpolates between all of the points generating a function for each interval, whereas only one function and one sample of that function for the "center" interval is necessary at any given instant to successfuly interpolate a digital audio signal.

To implement a spline-based FIR filter, it is necessary to pre-solve the matrix equation for one time interval $[t_k, t_{k+1}]$, and for arbitrary sample values $[Y_0, \ldots, Y_{n-1}]$. It is then necessary to sample the resultant polynomial, which is actually a function of the samples. This needs to be formulated as a set of weights which map the sample points to each oversampled (interpolated) point. If the oversampling factor is m, m sets of coefficients are necessary, each set containing n elements, such that the weighted linear sum of the original points produces the interpolated value at any instant.

Figure 9:
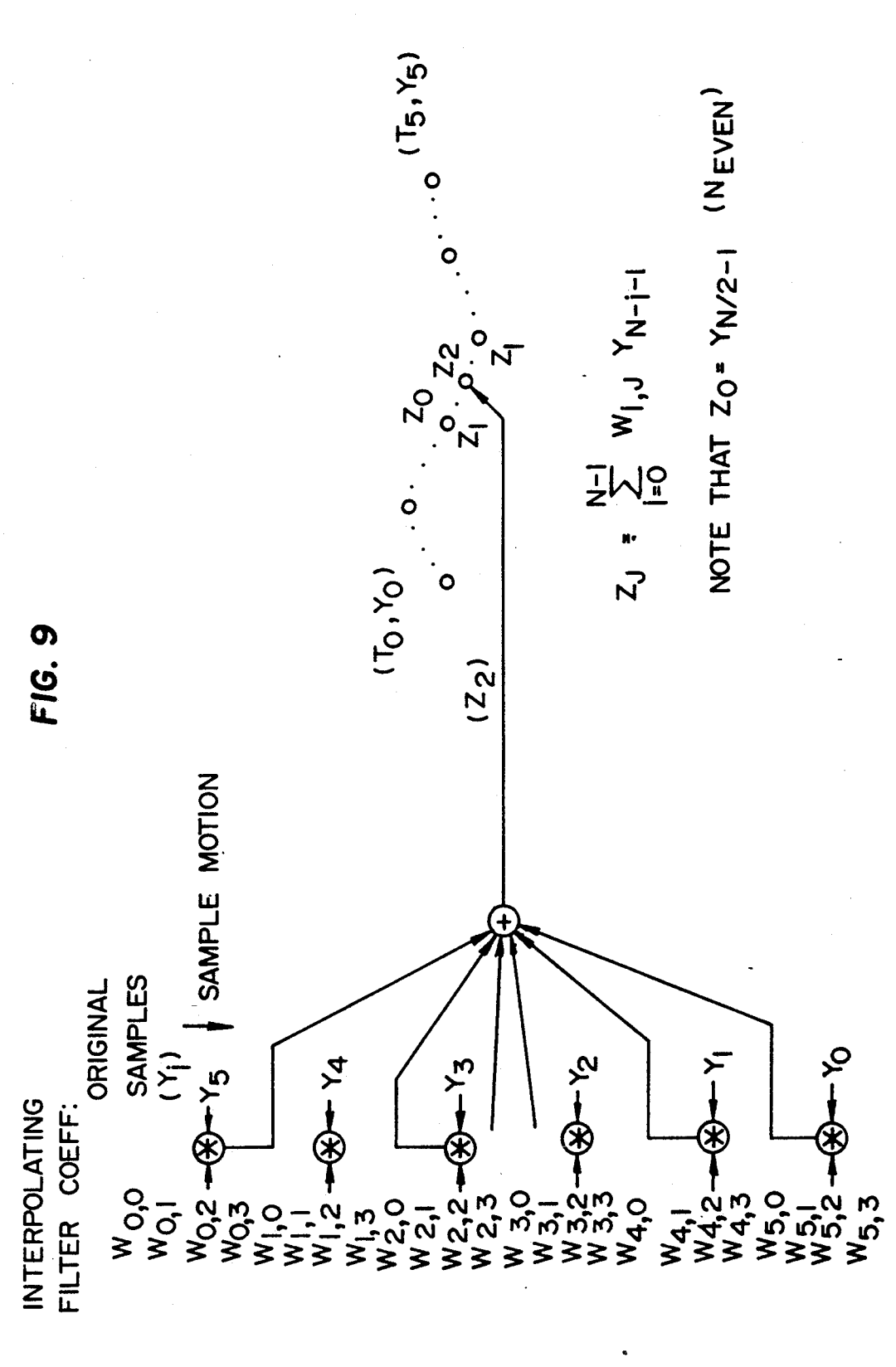

The accuracy of the interpolation is improved by using as many points as possible or practical. The accuracy is also best near the center interval $[X_k, X_{k+1}]$, as more information around the center interval is available. The function which interpolates this interval is sampled m times. When that interval is complete, a sample point on one end of the set is dropped ($Y_0$ or $Y_{n-1}$), and a point is appended to the other end. This is a process equivalent to convolution, with zero-padded samples, given that the interpolation can be formulated as a weighted sum. The process is repeated indefinitely, with $\{Y_i\}$ in effect shifting across an arbitrarily large set of samples. FIG. 9 diagrammatically shows the process of a time domain interpolation by convolution with zero-padded samples. In this example, m=4 (the oversampling factor) and n=6 (the number of sample points considered).

Figure 12B:
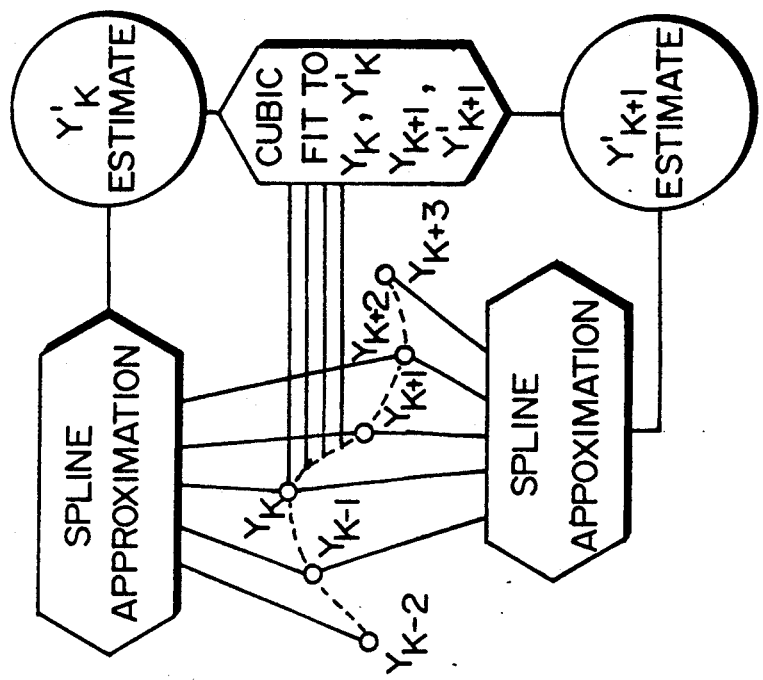
FIG. 12b is a diagrametric representation of the effectve functional blocks of a spine-based filter constructed according to the algorithm shown in FIG. 9.
Figure 12A:
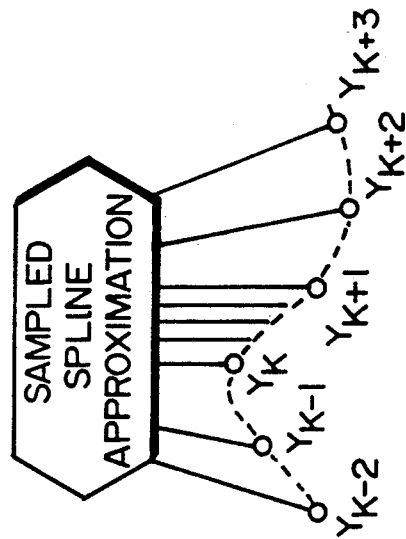
FIG. 12a is a diagrammatic representation of the effective functional blocks of the classic cubic spline-based interpolation method.

While a classic cubic spline-based interpolation method has continuous first and second derivatives throughout, this characteristic may be lost when implementing a spline-based digital filter. As shown in FIG. 12a, a distinct set of n sample points is used to create m interpolated samples for the center interval $[Y_k, Y_{k+1}]$. It will be seen that the derivatives for the interval $[Y_k, Y_{k-1}]$ are calculated from two slightly different sets of points $\{Y_{k-2} \ldots Y_{k+3}\}$ and $\{Y_{k-1} \ldots Y_{k+r}\}$ when using a classic cubic spline-based interpolation to calculate the two first derivatives for $Y_{k+1}$. Unfortunately, this mismatch in sets of points will introduce low levels of artifactual harmonics.

There is a way to ensure that the first derivatives match, while maintaining linear phase. Two spline approximations can be used for each interpolated interval instead of one. The first $n-1$ sample points can be used for one spline, to estimate the derivatives or $Y_{n/2-1}$, and the last $n-1$ points for $Y_{n/2}$. Then $Y_{n/2-1}$, $Y'_{n/2-1}$, $Y_{n/2}$, and $Y'_{n/2}$ can be used to determine a single cubic polynomial interpolating $[Y_{n/2-1}, Y_{n/2}]$ as shown in FIG. 12b which shows the effective functional blocks of a preferred embodiment of the spline filter where n=6 and m=4. Given that the "next" interval is $[Y_{n/2}, Y_{n/2+1}]$, it will be noted that the same $n-1$ points are used to estimate $Y'_{n/2}$ each time its derivative is estimated, thereby ensuring continuity of the first derivatives.

It will also be noted that the linear phase depends upon the symmetry of the digital filter coefficients. It can be shown that if the coefficients $\{d_i\}$ which are used to estimate the derivatives have a negative symmetry, the final filter coefficients will have the desired positive symmetry. If n is even, $d_i = -d_{m-i-1}$. This characteristic results in positive symmetry for the digital filter.

In a preferred embodiment, the spline-based algorithm is derived from what is referred to as a natural spline. This assumes that the second derivatives of the endpoints are zero, a resonable assumption given no information beyond those endpoints. As before, let the number of points be n even, and define $k=n/2-1$, so that the "center" interval is $[Y_k, Y_{k+1}]$ and let the oversampling factor be defined as m. The n samle points are equally spaced, so also define $h=(t_{i+1})-(t_i)$. These definition are used to create a system of equations which estimates the second derivatives of the n sample points. The estimates created by solving this system of equations will completely determine the spline-based algorithm of a preferred embodiment.

As the first step for solving this system of equations, define an $(n-3)$ dimensional tridiagonal square matrix A:

$$A = \begin{bmatrix} 4 & 1 & & & & & \\ 1 & 4 & 1 & & & & \\ & 1 & 4 & 1 & & & \\ & & \ddots & \ddots & \ddots & & \\ & & & 1 & 4 & 1 & \\ & & & & 1 & 4 & 1 \\ & & & & & 1 & 4 \end{bmatrix} \quad \text{(Eq. 8)}$$

Also, define an $(n-3) \times (n-1)$ dimensional matrix B:

$$B = \begin{bmatrix} 1 & -2 & 1 & & & \\ & 1 & -2 & 1 & & \\ & & \ddots & \ddots & \ddots & \\ & & & 1 & -2 & 1 \\ & & & & 1 & -2 & 1 \end{bmatrix} \quad \text{(Eq. 9)}$$

To obtain the second derivative estimates at the sample points, excluding the end points, it is necessary to solve the following equation:

$$Ay'' = (6/h^2)By \quad \text{(Eq. 10)}$$

where y and y'' are length $n-1$ and $n-3$ vectors. Specifically, y'' is a column vector defined by:

$$y'' = (y_1'', y_2'', \ldots, y_{n-3}'')^t \quad \text{(Eq. 11)}$$

For the first $n-1$ points, y is also a column vector defined by:

$$y = (y_0, y_1, \ldots, y_{n-2})^t \quad \text{(Eq. 12)}$$

Solving Equation (10) is a fairly simple process because of the simplicity of the matrix A, yielding:

$$y'' = (6/h^2)A^{-1}By \quad \text{(Eq. 13)}$$

For the derivation of a more general case of Equation (10), reference is made to Lee W. Johns, R. Dean Riess, *Numerical Analysis*, Addison-Wesley (1982), pp. 237-247.

The following equations produce the spline-based polynomials from the second derivative estimates for the intervals $[t_i, t_{i+1}]$, $i = 0, 1, \ldots, n-2$:

$$S_i(t) = (y_i''/6h)(t_{i+1}-t)^3 + (y_{i+1}''/6h)(t-t_i)^3 + ((y_{i+1}/h) - (hy_{i+1}''/6))(t-t_i) + ((y_i/h) - (hy_i''/6))(t_{i+1}-t) \quad \text{(Eq. 14)}$$

As described above, in a preferred embodiment, two spline approximates are used: (a) $i = 0, 1, \ldots, n-3$, covering the first $n-1$ points; and (b) $i = 1, 2, \ldots, n-2$, covering the last $n-1$ points. If we define r in the interval (0,1) by $rh = t - t_k$, and differentiate Equation (14) with respect to r, the following equations is obtained:

$$S'_k(r) = y''h(r - r^2/2 - \tfrac{1}{3}I) + y_{k+1}''h(r^2/2 - \tfrac{1}{6}) - (1/h)y_k + (1/h)y_{k+1} \quad \text{(Eq. 15)}$$

then, $$y_k' \approx S_k'(0) = -(h/3)y_k'' - (h/6)y_{k+1}'' - (1/h)y_k + (1/h)y_{k+1} \quad \text{(Eq. 16)}$$

Define a length $(n-3)$ column vector $S^{(1)}$:

$$S_i^{(1)} = \begin{cases} -(h/3), & i = k-1 \\ -(h/6), & i = k \\ 0, & \text{otherwise}, i = 0, 1, \ldots, n-4 \end{cases} \quad \text{(Eq. 17a)}$$

and define a length $n-1$ column vector $S^{(2)}$:

$$S_i^{(2)} = \begin{cases} -(1/h), & i = k \\ (1/h), & i = k+1 \\ 0, & \text{otherwise}, i = 0, 1, \ldots, n-2 \end{cases} \quad \text{(Eq. 17b)}$$

then, from Equation (16):

$$y_k' \approx S^{(1)T}y'' + S^{(2)T}y \quad \text{(Eq. 18)}$$

where $$S^{(1)T}y'' = S_0^{(1)}y_0'' + S_1^{(1)}y_1'' + S_2^{(1)}y_2'' + \ldots + S_{n-4}^{(1)}y_{n-3}'' \quad \text{(Eq. 19)}$$

Now, from Equation (18) and Equation (13):

$$y_k' \approx ((6/h^2)S^{(1)T}A^{-1}B + S^{(2)T})y = d^Ty \quad \text{(Eq. 20)}$$

where d is defined as $$d = ((6/h^2)S^{(1)T}A^{-1}B + S^{(2)T})^T \quad \text{(Eq. 21)}$$

The first derivative $y_k'$ is now estimated by a linear combination of the sample points $\{y_i\}$, $i = 0, 1, \ldots, n-2$. It will be noted that it can also be shown that $d_i = -d_{n-i-2}$.

Next, two length n variants of d are defined:

$$d^{(1)} = \begin{bmatrix} d_0 \\ d_1 \\ d_2 \\ \cdot \\ \cdot \\ \cdot \\ d_{n-2} \\ 0 \end{bmatrix} \quad \text{and} \quad d^{(2)} = \begin{bmatrix} 0 \\ d_0 \\ d_1 \\ d_2 \\ \cdot \\ \cdot \\ \cdot \\ d_{n-2} \end{bmatrix} \quad \text{(Eq. 22)}$$

By redefining $y = \{y_i\}$. $i = 0, 1, \ldots, n-1$, then:

$$y_k' \approx d^{(1)T}y \quad \text{and}$$

$$y_{k+1}' \approx d^{(2)T}y \quad \text{(Eq. 23)}$$

The last major step in this method is to fit a spline-based polynomial to $y_k$ and $y_{k+1}$ using the estimates for $y_k'$ and $y_{k+1}'$ set forth in Equation (23). In this system of equations, there are four unknowns and four equations. The unknowns are the four coefficients of:

$$P_k(t) = a(t - t_k)^3 + b(t - t_k)^2 + c(t - t_k) + d \quad \text{(Eq. 24)}$$

and $$P_k'(t) = 3a(t - t_k)^2 + b(t - t_k) + c \quad \text{(Eq. 25)}$$

The four equations are:

$$e_k T y = P_k(t_k) = d \quad e_{ki} = 1, i = k \quad \text{(Eq. 26)}$$
$$0, \text{ otherwise}$$

$$e_{k+1}{}^T y = P_k(t_{k+1}) = ah^3 + bh^2 + ch + d \quad \text{(Eq. 27)}$$

$$d^{(1)T} y = P_k'(t_k) = c \quad \text{(Eq. 28)}$$

$$d^{(2)T} Y = P_k'(t_{k+1}) = ah^2 + 2bh + c \quad \text{(Eq. 29)}$$

These equations (Equations 24—29) can be put into a compact matrix form by combining Equations (24) and Equations (25) on the first row, and placing Equation (26) to Equation (29) on the last rows:

$$\begin{bmatrix} (e_{k+1} - e_k)^T \\ d^{(2)T} \\ d^{(1)T} \\ e_k^T \end{bmatrix} y = \begin{bmatrix} h^3 & h^2 & h & 0 \\ 3h^2 & 2h & 1 & 0 \\ 0 & 0 & 1 & 0 \\ 0 & 0 & 0 & 1 \end{bmatrix} \begin{bmatrix} a \\ b \\ c \\ d \end{bmatrix}, \text{ or} \quad \text{(Eq. 30)}$$

$$D \quad y = \quad H \quad g \quad \text{(Eq. 31)}$$

It is necessary to solve Equation (31) for g to produce the interpolating cubic in the form $[t_k, t_{k+1}]$. Because matrix H of Equation (31) is invertible with:

$$H^{-1} = \begin{bmatrix} -2h^{-3} & h^{-2} & h^{-2} & 0 \\ 3h^{-2} & -h^{-1} & -2h^{-1} & 0 \\ 0 & 0 & 1 & 0 \\ 0 & 0 & 0 & 1 \end{bmatrix} \quad \text{(Eq. 32)}$$

therefore:

$$g = H^{-1} D y \quad \text{(Eq. 33)}$$

Combining Equation (24) and Equation (33) yields:

$$\begin{aligned} P_k(r) &= a(rh)^3 + b(rh)^2 + c(rh) + d \\ &= (rh)^3 + (rh)^2 \, rh \, 1 \, H^{-1} Dy \end{aligned} \quad \text{(Eq. 34)}$$

Solving for Equation (34) in matrix from results in:

$$P_k(r) = \begin{bmatrix} -2r^3 + 3r^2 \\ r^3 h - r^2 h \\ r^3 h - 2r^2 h + rh \\ 1 \end{bmatrix} Dy \quad \text{(Eq. 35)}$$

The time domain FIR filter coefficients for a preferred embodiment are now found by evaluating Equation (35) for each of the m values of r: 0, 1/m, 2/m, ... , (m−1)/m, and then interleaving the results.

It will be seen that the values of the coefficients generated by Equation 35) will change depending upon the resolution and smoothing desired, and on the format in which the digitized audio signals are stored. It is also instructive to note that the number of coefficients necessary for a given number of samples Q and sampling rate increase L is equal to, $$N = Q^*L \quad \text{(Eq. 36)}$$

Figure 8:
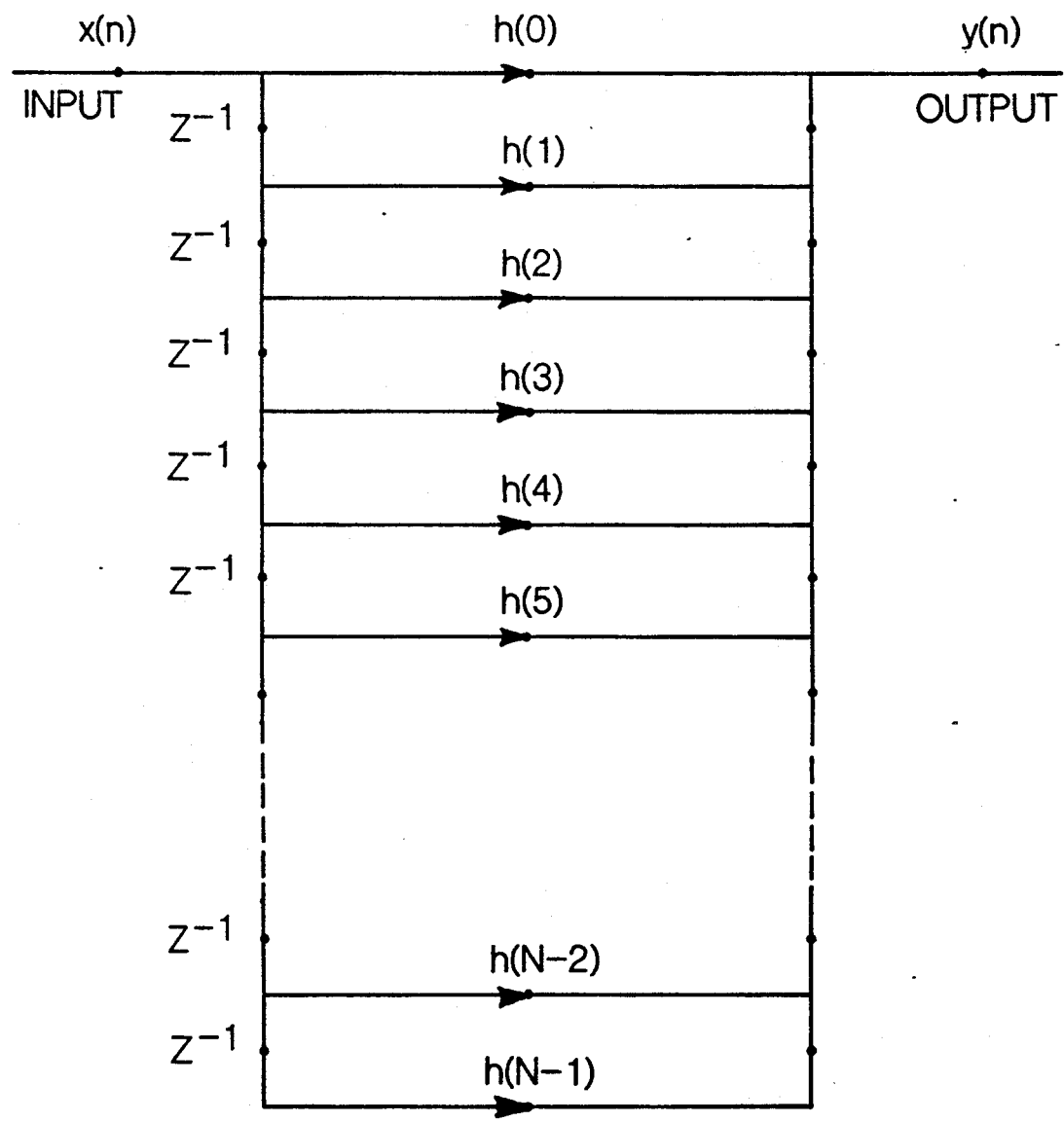
FIG. 8 is a signal flow graph of an interpolation system utilizing a time domain interpolation process in accordance with the present invention.

Because L−1 zero magnitude samples are inserted between each original sample pair, Q * L coefficients are needed to carry out the filtering operation. A signal flow graph of the basic interpolation system for such a time domain interpolation system is shown in FIG. 8. Such a network is equivalent to a traditional FIR filter design. Thus, using the present invention, the spline-based time domain interpolation can be implemented as an FIR topology.

In a preferred embodiment, the time domain interpolation is calculated for a 3rd order polynomial to fit the center interval of the contour of twelve (Q) original samples at a time by generating 15 new samples between each of the original twelve samples. The computation for the spline-based polynomial of the 3rd order to fill in 15 interpolated samples between each original samples is based on a formula in the form of:

$$\text{(Eq. 37)}$$
$$\text{Output}(0) = x(191)^*c(0) + x(190)^*c(1) + \ldots + x(0)^*c(191)$$
$$\text{Output}(1) = x(192)^*c(0) + x(191)^*c(1) + \ldots + x(1)^*c(191)$$
$$\vdots$$
$$\text{Output}(15) = x(206)^*c(0) + x(205)^*c(1) + \ldots + x(15)^*c(191)$$

where x(n)=input sample values and c(n)=the coefficients for the polynomial as calculated above. There are 192 coefficients in Equation (37) because there are 192 variables being computed (12*16). However, because only every 16th variable is non-trivial (i.e., non-zero), Equation (37) may be shortened by eliminating the 15 intermediate coefficients where x(n)=0. Consequently, the output equations may be shortened to:

$$\text{Output}(0) = x(191)^*c(0) + x(175)^*c(16) + \ldots + x(15)^*c(175) \quad \text{(Eq. 38)}$$
$$\text{Output}(1) = x(191)^*c(1) + x(175)^*c(17) + \ldots + x(15)^*c(176)$$
$$\vdots$$
$$\text{Output}(15) = x(191)^*c(15) + x(175)^*c(31) + \ldots + x(15)^*(191)$$

Of course, the values for Output(0), Output(16), etc. are a trivial calculation in the interpolation process because the actual data values for those samples are used and the coefficient is one. By determining the coefficients for the polynomial of Equation (38), the signal processing means 10 of the present invention is able to perform a time domain interpolation of a segment of the audio signal and can achieve the oversampling rates necessary to enable the high-quality reproduction of musical sound in a professional or high-end digital audio system.

Implementing Time Domain Interpolation

To solve the problems inherent in the prior art frequency domain oversampling techniques and implement the type of time domain interpolation described above, the present invention utilizes a unique approach to the design and implementation of the audio signal reconstruction process. This approach emphasizes certain design constraints that are different from the prior art digital audio systems.

A goal of the present invention is to guarantee optimal transient response. Traditional frequency domain oversampling cannot incorporate time-domain transient parameters into its design. The response of a time domain oversampling system, however, can be constrained to pass all original sample points guaranteeing that no significant overshoot or widening of transients will occur.

Because of the time constraints involved in performing the necessary calculations to achieve the desired 64× oversampling (up to 48,000 original data samples per second for the R-DAT Format), a preferred embodiment of the present invention utilizes several novel techniques to obtain an effective processing rate of 72 million calculations per second. First, each of the digital signal processors, DSP0 and DSP1, contains an arithmetic unit with a 16 bit×16 bit parallel multiplier that generates a full 32 bit product in 55 ns. The product can be accumulated with one of two 36 bit accumulators. Each DSP operates at a clock frequency of 36 MHz. Consequently, the present invention utilizes a parallel pipeline architecture on each channel to operate two DSPs, DSP0 and DSP1, in parallel to achieve the required 72 MIPS processor speed. In a preferred embodiment, the pair of DSPs operate in tandem with DSP0 used to calculate the even sample vaues and DSP1 used to calculate the odd sample values, thereby effectively doubling the amount of time available for each processor to complete the necessary calculations before moving to the next value.

Figure 10A:
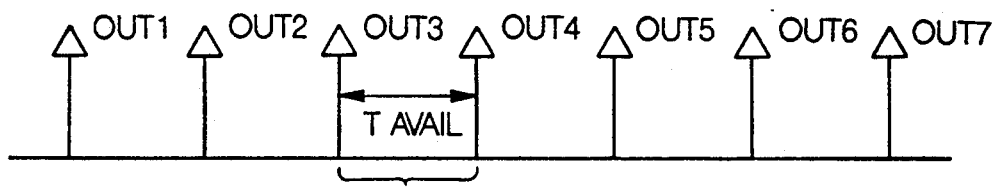
FIGS. 10a 10b and 10c are a time chart representation of the time available for the time domain interpolation process utilized in the present invention.
Figure 10B:
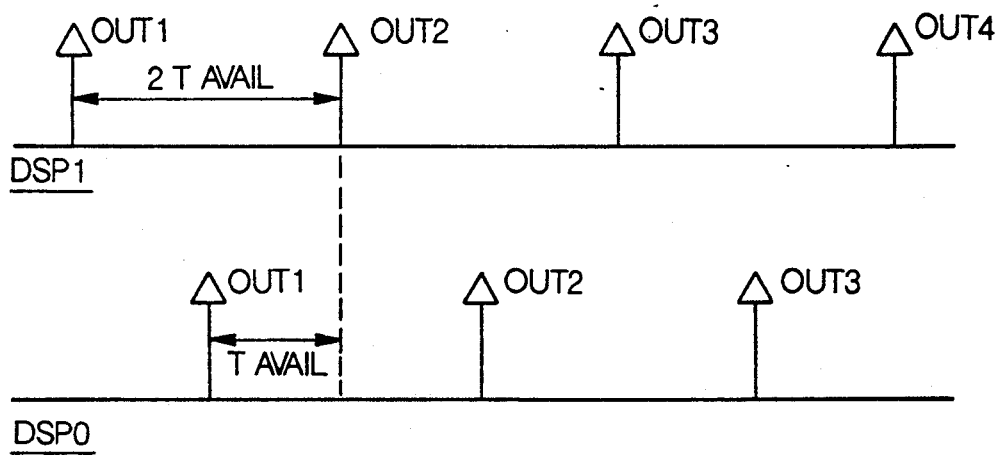
Figure 10C:
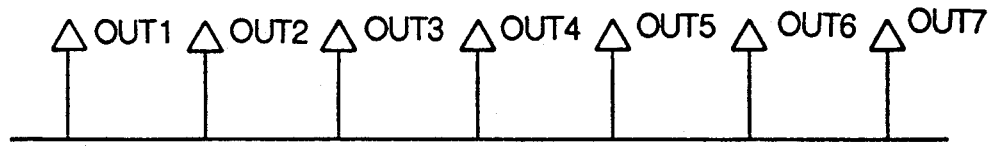

Referring now to FIGS. 10a through 10c, the parallel pipeline structure of the two DSPs, DSP0 and DSP1 will be explained. As shown in FIG. 10a, the time available to compute each output for the Interpolated Data output is $T_{avail}$. In this case, because the processor clock speed of each DSP is only 36MHz, the calculation of the coefficients for the desired equation cannot be completed in $T_{avail}$. If however, the calculations were performed for every other output, then, as shown in FIG. 10b, the effective $T_{avail}$ is doubled. By splitting the calculations for the even and odd Interpolated Data outputs between the two DSP's, the present invention achieves both the speed and the precision necessary to perform the required calculations and drive the high length filter that comprises the digital conversion means 30 and 32. Each DSP is loaded with the identical interpolation program, with the calculations for the relevant coefficients for the even and odd outputs split between the two DSP's such that DSP0 calculates the even indexed coefficients and DSP1 calculates the odd-indexed coefficients. When the outputs of the two DSPs are then summed together, as shown in FIG. 10c, the result is a time domain interpolation that can produce the interpolated samples at twice the rate of a single DSP. It will be apparent that this method of interleaving the DSP's to calculate the outputs for each new set of samples could be extended to more than just a pair of DSP's operating in tandem. In general, a time domain interpolation simulating an FIR filter of any length could be implemented by this technique. If the desired FIR filter was of length N, and a single DSP could compute M terms between input samples, then N/M DSPs would be required in the parallel method described.

Figure 11A:
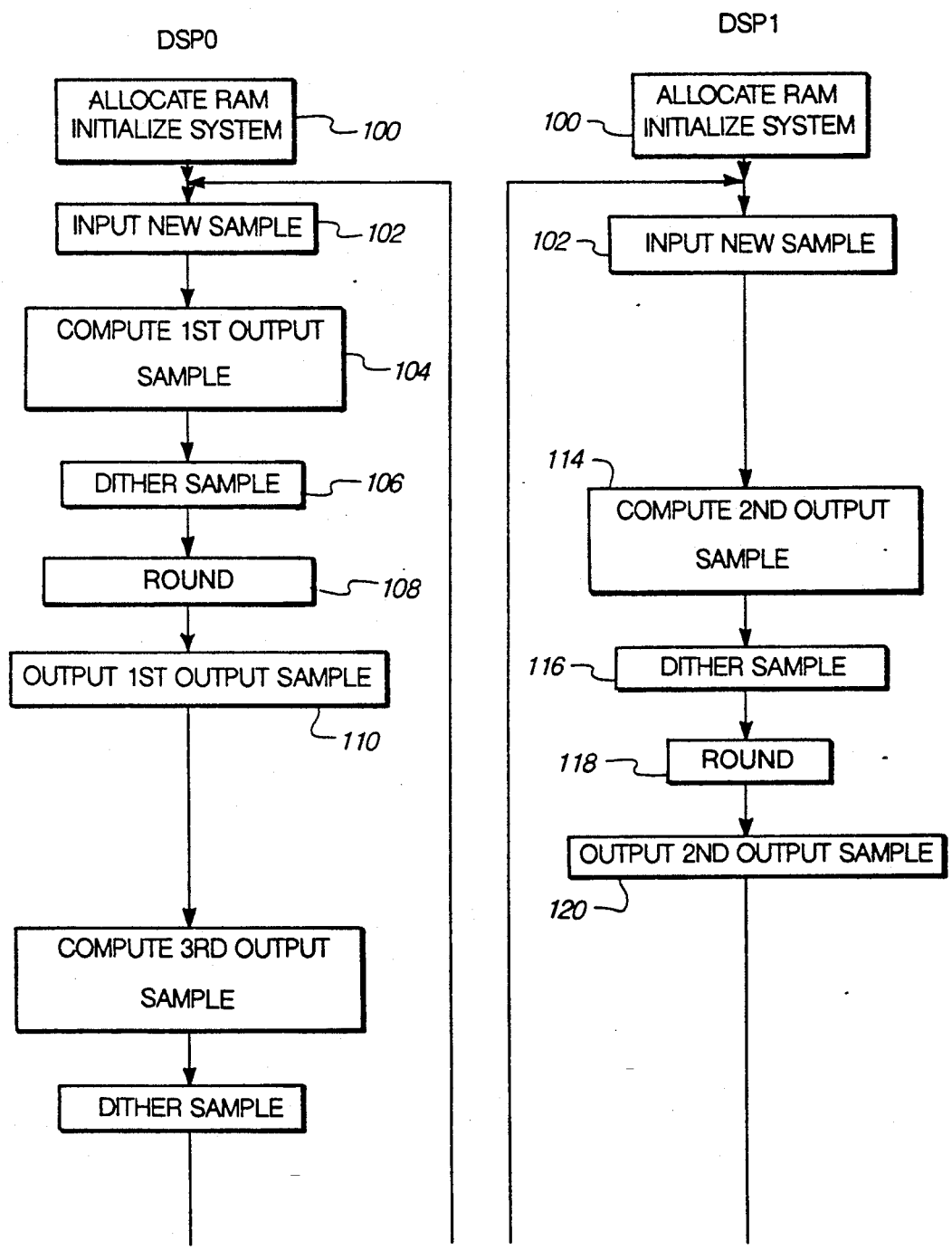
FIGS. 11a and 11b are a flow chart showing the program flow for a pair of digital signal processors performing the time domain interpolation in accordance with the present invention for a single channel.
Figure 11B:
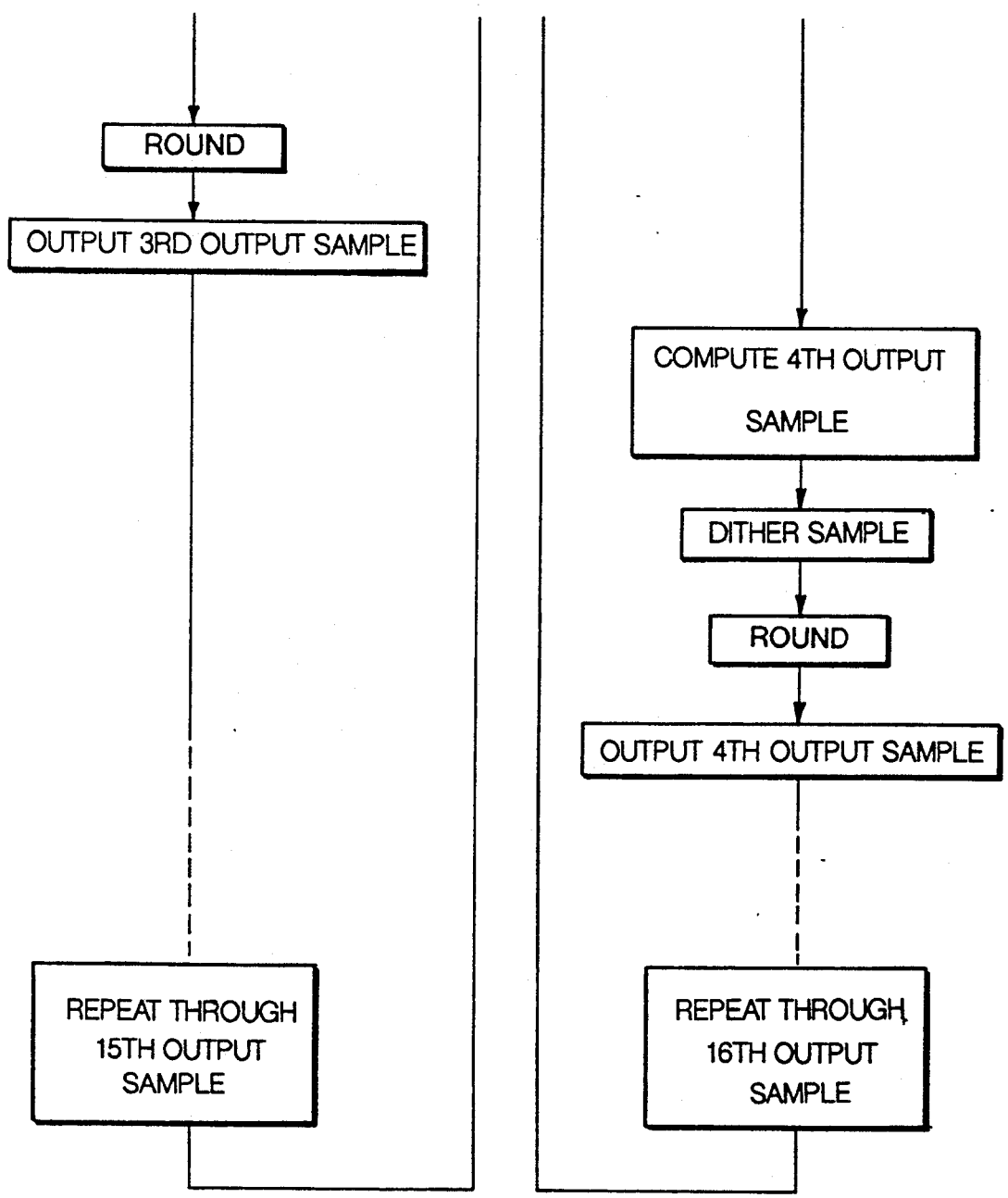

Referring noew to FIG. 11, a simplified flow chart for the software for each DSP, DSP0 and DSP1, is shown. The software is written for the AT&T WE DSP16 digital signal processor described above. At Initialize 100, each DSP is initialized and memory is allocated for the working variables used by the processors. The program will assume zero values for the first twelve (Q) samples so that the samples at the beginning of the segment of digitized music material can also be interpolated using the same procedures as the remaining samples. In a preferred embodiment, a pointer is set to a circular buffer containing the predetermined values for the particular coefficients of Equation (38) that will be used in performing the interpolation. In this manner, it is a simple matter to select a different interpolation algorithm merely by changing the values for the coefficients in the buffer. At Input 102, a new sample value is input into the range of Q samples for which the interpolation will be performed. At Compute 104, DSP0 computes the values for the first interpolated sample output in accordance with the predetermined coefficients pointed to by the pointer for DSP0. The multiply calculations are performed with 16-bit numbers, yielding a 32-bit result. The accumulate calculations are performed on the 32-bit result, yielding a 36-bit precision value. At Dither 106, one-half of the least-significant-bit (LSB) of a pseudo-random noise value s added to the LSB for each calculation. In essence, the dithering process takes the place of a normal rounding processing during the calculation, but produces a statistically better time average for estimating the interpolated value of the signal. At Round 108, the final value of the first interpolated sample of the Interpolated Data output is rounded to 16-bits to be transferred to the digital volume control means 24. At Output 110, the first interpolated sample output is transferred to the digital volume control means 24 and onto the direct power output digital to analog conversion means 30.

At Compute 114, DSP 1 computes the values for the second interpolated sample output in accordance with the predetermined coefficients pointed to by the pointer for DSP 1. The second interpolated sample is dithered at Dither 116 and rounded at Round 118 to be output at Output 120 as the final value of the second interpolated sample of the Interpolated Data output. Because of the parallel pipeline structure described above, DSP1 has an adequate amount of time in which to perform the necessary calculations. This process is repeated until all sixteen interpolated sample outputs have been generated, which each of the DSPs having sufficient time to perform the calculations necessary to achieve an effective 16× oversampling rate. The Interpolated Data output by the pair of DSPs, DSP0 and DSP1, for each channel implements the 192 tap Finite Impulse Response (FIR) structure in accordance with equation (38).

An additional advantage of using the time domain interpolation of the embodiment of the present invention as described therein is that the dithering of the interpolated values is accomplished on a 16-bit sample value and the additional increase in bit resolution resulting from the digital volume control means 24 and the direct power digital to analog conversion means 30 is performed after the dithering process is accomplished. This method of performing dithering on a digital sample that has the same bit-resolution as the original digital sample contained in the digital audio signal results in a more accurate reproduction of the original audio signal. In some of the present digital audio systems which perform oversampling in the frequency domain, dithering is performed on the interpolated samples at a bit resolution higher than the bit resolution of the original digital sample (e.g., dithering at 18-bit or 20-bit resolution). As a result, these digital audio systems introduce dithering error into the reconstruction of the digital audio signal by assuming a higher degree of resolution than is actually present in the original digital sample. In contrast, the present invention achieves the same or better bit resolution without incurring suc dithering error by using the digital volume control and delay line digital to analog conversion techniques to increase the bit resolution of the Interpolated Data after the interpolated samples have been dithered.

Although the description of a preferred embodiment has been presented, it is contemplated that various changes could be made without deviating from the spirit of the present invention. Accordingly, it is intended that the scope of the present invention be dictated by the appended claims rather than by the description of a preferred embodiment.

We claim:

1. An apparatus for performing time domain interpolation of a digital audio signal comprising:
   input means for receiving the digital audio signal comprised of a plutality of original digital samples representing an analog audio signal sampled at a defined sampling rate to produce a received signal and for decoding the received signal to produce a decoded signal;
   processing means for performing a time domain interpolation on the decoded signal to produce a set of interpolated data samples that together with the original digital samples comprise an interpolated data signal having an increased sampling rate over the defined sampling rate of the digital audio signal; and
   means for converting the interpolated data signal into an analog power audio output signal to be transmitted to a speaker, such that the speaker is driven by the audio output signal without further amplification to produce sound waves.

2. The apparatus of claim 1 wherein the digital audio signal represents musical information as stereophonic digital audio signals having a left channel signal and a right channel signal and the processing means is comprised of two parallel digital signal processing means, one digital signal processing means for processing the left channel signal and one digital signal processing means for processing the right channel signal.

3. The apparatus of claim 1 wherein the processing means is comprised of a pair of interleaved digital signal processors, a first digital signal processor for computing a set of even sample values of a time domain interpolation equation and a second digital signal processor for computing a set of odd sample values of the time domain interpolation equation.

4. The apparatus of claim 1 wherein the time domain interpolation is accomplished by computing the interpolated samples using a time domain interpolation equation that is a non-iterative polynomial which uses a number Q of consecutive original digital samples in the interpolation.

5. The apparatus of claim 4 wherein the time domain interpolation equation is a spline-based interpolation.

6. The apparatus of claim 4 wherein the time domain interpolation equation is a cubic spline having two spline approximations which are used to produce the interpolated data samples between consecutive original digital samples.

7. The apparatus of claim 4 wherein (Q) the number of consecutive original digital samples is twelve and the number of interpolated data samples generated for each pair of consecutive original digital samples used in the interpolation is fifteen.

8. The apparatus of claim 1 wherein the means for converting the interpolated data signal directly into an analog power audio output signal comprises:
   digital-to-analog converting means for converting the interpolated digital signal to an analog current output signal;
   power current-to-voltage converting means having the analog current output signal operably connected to a summing junction of the power current-to-voltage converter means for converting the analog current output signal to the analog power audio output signal provided at an output terminal of the power current-to-voltage converting means; and
   a single resistive feedback means operably connected between the output terminal and the summing junction of the power current-to-voltage converting means for providing a feedback signal to the power current-to-voltage converting means.

9. The apparatus of claim 8 wherein the digital-to-analog converting means is comprised of a plurality of transversal, summed-multiport digital-to-analog converters with delay means for delaying the analog converter is delayed by a time period in proportion to the total number of digital-to-analog converters in the converting means.

10. The apparatus of claim 9 wherein the audio output signal is a differential signal and there are four digital-to-analog converters, each converter being delayed by ¼th of the time period from the previous digital-to-analog converter in the delay line and wherein the first and third of the four digital-to-analog converters are used to generate the positive side of the differential signal and the second and fourth of the four digital-to-analog converters are used to generate the negative side of the differential signal.

11. The apparatus of claim 1 wherein the processing means further comprises digital volume control means for controlling the volume of the output audio signal by digitally adjusting the interpolated data signal.

12. The apparatus of claim 1 wherein the processing means further comprises means for performing dithering on the interpolated data signal at a bit resolution equal to the bit resolution of the digital audio signal.

13. An apparatus for reconstructing a digital audio signal comprising:
   receiving means for receiving the digital audio signal comprised of a plurality of original digital samples representing an analog audio signal sampled at a defined sampling rate and ordered in a time sequence and divided into a left channel signal and a right channel signal to produce a received signal;
   phase lock loop means for synchronizing the received signal with an internal clock signal to produce a synchronized signal;
   decoding means for demodulating the synchronized signal and extracting from the synchronized signal a timing signal and an original data signal representing the original digital samples for the corresponding left and right channel signals;
   left and r ight processing means for performing a time domain interpolation on a number (Q) of consecutive elements of the original data signal for the corresponding channel signal in the f orm of a non-iterative solution of a polynomial equation to produce a set of interpolated data samples that together with the original digital samples comprise an interpolated data signal for the corresponding channel signal having an increased sampling rate over the defined sampling rate of the corresponding digital audio signal; and left and right converting means for converting the interpolated data signal into a left and a right analog power audio output signal to be transmitted to a left and a right speaker, respectively, such that each speaker is driven by the respective audio output signal without further amplification to produce sound waves.

14. The apparatus of claim 13 wherein each of the left and right processing means is comprised of a pair of interleaved digital signal processors, a first digital signal processor for computing a set of even sample values of a time domain interpolation equation and a second digital signal processor for computing a set of odd sample values of the time domain interpolation equation.

15. The apparatus of claim 13 wherein the time domain interpolation is accomplished by computing the interpolated samples using a time domain interpolation equation that is a non-iterative polynomial which uses the number Q of consecutive original digital samples in the interpolation.

16. The apparatus of claim 15 wherein the time domain interpolation equation is a cubic spline having two spline approximations which are used to produce the interpolated data samples between consecutive original digital samples.

17. The apparatus of claim 16 wherein (Q) the number of consecutive original digital samples is twelve and the number of interpolated data samples generated for each pair of consecutive original digital samples used in the interpolation is fifteen.

18. The apparatus of claim 13 wherein the left and right means for converting the interpolated data signal into an analog power audio output signal each comprise:

digital-to-analog converting means for converting the interpolated digital signal to an analog current output signal;

power current-to-voltage converting means having the analog current output signal operably connected to a summing junction of the power current-to-voltage converter means for converting the analog current output signal to the analog power audio output signal provided at an output terminal of the power current-to-voltage converting means; and a single resistive feedback means operably connected between the output terminal and the summing junction of the power current-to-voltage converting means for providing a feedback signal to the power current-to-voltage converting means.

19. The apparatus of claim 18 wherein the digital-to-analog converting means is comprised of a plurality of transversal, summed-multiport digital-to-analog converters with delay means for delaying the analog output signal from each converter arranged such that each digital-to-analog converter output signal from each converter arranged such that each digital-to-analog converters in the converting means.

20. The apparatus of claim 19 wherein the audio output signal is a differential signal and there are four digital-to-analog converters, each converter being delayed by ¼th of the time period from the previous digital-to-analog converter in the delay line and wherein the first and third of the four digital-to-analog converters are used to generate the positive side of the differential signal and the second and fourth of the four digital-to-analog converters are used to generate the negative side of the differential signal.

21. The apparatus of claim 13 wherein the left and right processing means further comprises digital volume control means for controlling the volume of the output audio signal by digitally adjusting the interpolated data signal.

22. The apparatus of claim 13 wherein the left and right processing means further comprises means for performing dithering on the interpolated data signal at a bit resolution equal to the bit resolution of the digital audio signal.

23. A method of reconstructing a digital audio signal using a digital signal processor and a direct power digital-to-analog converter, the method comprising the steps of:

receiving a digital audio signal comprising a plurality of original digital samples representing an analog audio signal sampled at a defined sampling rate and ordered in time sequence;

for a number (Q) of consecutive original digital samples, calculating in the time domain one or more interpolated samples between consecutive pairs of original digital samples based on the original digital samples and using the digital signal processor to perform a non-iterative interpolation; and converting both the original digital samples and the interpolated samples to an analog power audio output signal using the direct power digital-to-analog converter.

24. The method of claim 23 wherein the digital audio signal represents musical information as stereophonic digital audio signals having a left channel signal and a right channel signal and the step of calculating in the time domain one or more interpolated samples is performed separately for the left channel signal and the right channel signal.

25. The method of claim 23 wherein the step of calculating in the time domain one or more interpolated samples is performed by computing a set of even sample values of a time domain interpolation equation using a first digital signal processor and computing a set of odd sample values of the time domain interpolation equation using a second digital signal processor.

26. The method of claim 23 wherein the step of calculating in the time domain one or more interpolated samples involves calculating a set of sample values for a spline-based non-iterative polynomial, where Q is the number of consecutive original digital samples used in the interpolation.

27. The method of claim 26 wherein (Q) the number of consecutive original digital samples is twelve and wherein the step of calculating a set of sample values comprises the step of generating fifteen interpolated samples for each pair of consecutive original digital samples used in the interpolation.

28. The method of claim 23 wherein the step of converting the samples to an analog power audio output signal comprises the steps of:

converting the samples to an analog current output signal using a digital-to-analog converter;

receiving the analog current output at a summing junction of a power current-to-voltage operational amplifier converter;

converting the analog current output signal to the analog power audio output signal;

providing the analog power audio output signal at an output terminal of the power current-to-voltage operational amplifier converter; and generating a feedback signal to the power current-to-voltage operational amplifier converter by providing a single resistive feedback network operably connected between the output terminal and the summing junction of the power current-to-voltage operational amplifier converter.

29. The method of claim 28 wherein the step of converting the samples to an analog current output signal further comprises the steps of:

providing a number N of digital-to-analog converters having outputs which are operably summed together to create the analog current output signal; and delaying the samples provided to each of the digital-to-analog converters by a time period in proportion to the total number N of digital-to-analog converters.

30. The method of claim 29 wherein the audio output signal is a differential signal and there are four digital-to-analog converters, each converter being delayed by $\frac{1}{4}$th the time period from the previous digital-to-analog converter and wherein the positive side of the differential signal is generated using analog current output from the first and third of the four digital-to-analog converters and the negative side of the differential signal is generated using the analog current output from the second and fourth of the four digital-to-analog converters.

31. The method of claim 23 wherein the step of calculating in the time domain one or more interpolated samples further includes the step of controlling the volume of the output audio signal by digitally adjusting the interpolated samples.

32. The method of claim 23 wherein the step of calculating in the time domain one or more interpolated samples further includes the step of performing dithering on the interpolated samples at a bit resolution equal to the bit resolution of the digital audio signal.

* * * * *

UNITED STATES PATENT AND TRADEMARK OFFICE
CERTIFICATE OF CORRECTION

PATENT NO. : 5,226,000
DATED : July 6, 1993
INVENTOR(S) : Robert W. Moses, et al.

It is certified that error appears in the above-identified patent and that said Letters Patent is hereby corrected as shown below:

In column 1, line 19, "etitled" should be "entitled".

In column 2, line 37, "thpe" should be "type".

In column 2, line 41, "ofd" should be "of".

In column 2, line 42, "three0dimensional" should be "three-dimensional".

In column 2, line 44, "criticalthat" should be "critical that".

In column 2, line 45, "posses" should be "possess".

In column 2, line 54, "it" should be "It".

In column 3, line 4, "The" should be "the".

In column 3, line 29, "inthe" should be "in the".

In column 3, line 59 "ethod" should be "method".

In column 4, line 2, "althought" should be "although".

In column 4, line 12, "fitler" should be "filter".

In column 6, line 10, "figital" should be "digital".

In column 6, line 11, "hte" should be "the".

UNITED STATES PATENT AND TRADEMARK OFFICE
CERTIFICATE OF CORRECTION

PATENT NO. : 5,226,000
DATED : July 6, 1993
INVENTOR(S) : Robert W. Moses, et al.

It is certified that error appears in the above-identified patent and that said Letters Patent is hereby corrected as shown below:

In column 6, line 16, "ina" should be "in a".

In column 7, line 13-14, "effectve" should be "effective".

In column 7, line 14, "spine" should be "spline".

In column 7, line 20, "not" should be "now".

In column 7, line 31, "willbe" should be "will be".

In column 7, line 32, "willbe" should be "will be".

In column 7, line 40, "Date" should be "Data".

In column 7, line 63, "embodiments" should be "embodiment".

In column 8, line 9, "ge" should be "be".

In column 8, line 14, "controleld" should be "controlled".

In column 8, line 22, "emans" should be "means".

In column 8, line 23, "ny" should be "be".

In column 8, line 24, "received" should be "receive".

In column 8, line 26, "Format" should be "format".

UNITED STATES PATENT AND TRADEMARK OFFICE
CERTIFICATE OF CORRECTION

PATENT NO. : 5,226,000

DATED : July 6, 1993

INVENTOR(S) : Robert W. Moses, et al.

It is certified that error appears in the above-identified patent and that said Letters Patent is hereby corrected as shown below:

In column 8, line 46, "Standar" should be "Standard", and "fuly" should be "fully".

In column 8, line 52, "adn" should be "and".

In column 9, line 56, "Power" should be "power".

In column 9, line 58, "LN12C" should be "LM12C".

In column 10, line 64, "int he" should be "in the".

In column 11, line 6, "T=T/1" should be "T'=T/1".

In column 11, line 30, "Frourier" should be "Fourier".

In column 11, line 34, "W(e$^{jwT}$)" should be "W(e$^{jwT'}$)".

In column 11, line 38, "$2\pi/T-2\pi/LT$" should be "$2\pi/T-2\pi/LT'$".

In column 11, line 47, "iedal" should be "ideal".

In column 13, line 5, "(n$_{even}$) (X, Y)0" should be "(n$_{even}$) (X, Y)$_0$".

In column 13, line 17, "typicall" should be "typically".

In column 13, line 18, the "X"s should be lower case.

UNITED STATES PATENT AND TRADEMARK OFFICE
CERTIFICATE OF CORRECTION

PATENT NO. : 5,226,000
DATED : July 6, 1993
INVENTOR(S) : Robert W. Moses, et al.

It is certified that error appears in the above-identified patent and that said Letters Patent is hereby corrected as shown below:

In column 13, line 36, the "X" and "Y" should be lower case.

In column 13, line 56, the "Y" should be lower case.

In column 13, line 57, the "Y" should be lower case.

In column 13, line 67, the "X"s should be lower case.

In column 14, lines 3, 4, 8, 20, 21, 22, 23, 25, 33, 34, 35, 36, 39, 40, 41 and 58, the "Y"s should be lower case.

In column 15, line 60, "1" should be removed after the first occurrence of "1/3", and the second occurrence of "1/3" should be "1/6".

In column 16, line 22-23, "$S^{(1)}Ty''=S_0^{(1)}y''+S_1'=S_2^{(1)}y2''=...+S_{n-4}^{(1)}y_{n-3}''$" should be "$S^{(1)}Ty''=S_0^{(1)}y''+S_1^{(1)}y_1''+S_2^{(1)}y_2''+...+S_{n-4}^{(1)}y_{n-3}''$".

In column 16, line 27, "h" should be inserted after the "/".

In column 16, line 57, "Y" should be "y".

In column 16, line 66, "2" should be inserted before "b".

In column 17, line 10, "Y" should be "y" and "3" should be inserted before "ah$^2$".

In column 17, line 46, "+" should be removed.

UNITED STATES PATENT AND TRADEMARK OFFICE
CERTIFICATE OF CORRECTION

PATENT NO. : 5,226,000
DATED : July 6, 1993
INVENTOR(S) : Robert W. Moses, et al.

It is certified that error appears in the above-indentified patent and that said Letters Patent is hereby corrected as shown below:

In column 17, line 61, "35)" should be "(35)".

In column 18, line 17, "samples" should be "sample".

In column 19, line 63, "noew" should be "now".

In column 20, line 21, "s" should be "is".

In column 21, line 5, "suc" should be "such"

In column 21, line 21, "plutality" should be "plurality".

In column 22, line 25, "current output signal from each converter arranged such that each digital-to-analog" should be inserted after "analog".

In column 22, line 66, "f orm" should be "form".

UNITED STATES PATENT AND TRADEMARK OFFICE
CERTIFICATE OF CORRECTION

PATENT NO. : 5,226,000
DATED : July 6, 1993
INVENTOR(S) : Robert W. Moses, et al It is certified that error appears in the above-indentified patent and that said Letters Patent is hereby corrected as shown below:

In column 23, lines 61-62, "output signal from each converter arranged such that each" should be deleted and "is delayed by a time period in proportion to the total number of" should be inserted.

Signed and Sealed this

Fifth Day of April, 1994

BRUCE LEHMAN

Attest:

Attesting Officer    Commissioner of Patents and Trademarks